US006559556B1

(12) United States Patent
Wills

(10) Patent No.: US 6,559,556 B1
(45) Date of Patent: May 6, 2003

(54) ADAPTER CABLE TO POWER A PORTABLE COMPUTER SYSTEM IN A MILITARY VEHICLE VIA A STANDARD 24 VOLT DC POWER OUTLET, UTILIZING THE COMPUTER SYSTEM'S INTERNAL TRANSFORMER

(75) Inventor: Robert P Wills, Ft. Campbell, KY (US)

(73) Assignee: Robert Patrick Wills, APO AE ( * ) Notice: Subject to any disclaimer, the term of this patent is extended or adjusted under 35 U.S.C. 154(b) by 0 days.

(21) Appl. No.: 09/490,472

(22) Filed: Jan. 24, 2000

(51) Int. Cl.$^7$ .................................................. B60L 1/00
(52) U.S. Cl. ....................................... 307/10.1; 439/624
(58) Field of Search ................................ 307/10.1, 9.1; 361/686, 683; 219/202; 439/504, 512, 624, 502, 623

(56) References Cited

U.S. PATENT DOCUMENTS

| 4,248,494 A | * | 2/1981 | McDonald et al. | 439/638 |
| 4,936,769 A | * | 6/1990 | Anderson, Jr. | 439/504 |
| 5,355,273 A | * | 10/1994 | Yoshizawa et al. | 361/105 |
| 5,555,491 A | * | 9/1996 | Tao | 361/686 |
| 5,564,943 A | * | 10/1996 | Weiss | 439/502 |
| 5,604,663 A | * | 2/1997 | Shin et al. | 361/686 |
| 5,633,782 A | * | 5/1997 | Goodman et al. | 361/683 |
| 5,831,242 A | * | 11/1998 | Gallagher | 219/202 |
| 5,966,285 A | * | 10/1999 | Sellers | 361/686 |
| 6,115,277 A | * | 9/2000 | Plichta et al. | 363/146 |

FOREIGN PATENT DOCUMENTS

DE 3743316 A1 * 6/1989

OTHER PUBLICATIONS

12 Volt Pumps, The Lifestyle Store, Copyright 1997, 1998, no month. 3 pages.*
Laptop Pack, no month. 8 pages.*
TSM Notes, CI/HUMINIT Automation–Step One, Colonel Jerry V. Proctor, Jul.–Sep. 1998. 2 pages.*
Counterintelligenct /Human Intelligence (CI/HUMINT), John Pike, Feb. 2000, 5 pages.*
Derwent–ACC–No.: 1989–193551, English Translation of Abstract of DE 3743316 cited above. Inventor: Frister et al.*

* cited by examiner

Primary Examiner—Brian Sircus
Assistant Examiner—Sharon A. Polk
(74) Attorney, Agent, or Firm—PatentPro

(57) ABSTRACT

An adapter cable designed to power the CHATS computer system in a military vehicle by utilizing a 24-volt DC power outlet to provide power to the computer system's internal transformer, allowing the vehicle's generator to recharge the computer's battery as well as operate the computer and all associated components.

The adapter cable's ten (10) foot length added to the CHATS power cable's length of approximately five (5) feet allows the user to operate the CHATS computer system in a remote location up to 15 feet from the vehicle while still relying on the vehicle's electrical system for power. This eliminates the need for a portable generator and greatly extends the time that the computer system can be operated in remote locations. This time limit is governed only by the amount of fuel required to operate the supporting vehicle for half an hour every five hours.

3 Claims, 2 Drawing Sheets

ADAPTER CABLE TO POWER A PORTABLE COMPUTER SYSTEM IN A MILITARY VEHICLE VIA A STANDARD 24 VOLT DC POWER OUTLET, UTILIZING THE COMPUTER SYSTEM'S INTERNAL TRANSFORMER

BACKGROUND OF THE INVENTION

1. Fields of the Invention

This invention relates generally to the field of power supplies and more particularly to an adapter cable which allows the Counterintelligence HUMINT (Human Intelligence) Automated Tool Set (CHATS), a portable military computer system to be operated using the electrical system of a military vehicle for power, eliminating the limitations imposed upon the CHATS system by its internal batteries.

2. Background

At present, when military intelligence teams are deployed, a portable generator or other AC power source is required for the Counter Intelligence HUMINT (Human Intelligence) Automated Tool Set (CHATS) computer system. Due to power requirements of the CHATS, which include a lap top computer, laser scanner, color printer, digital camera and a secure telephone, the internal batteries are unable to provide power for more than two hours. This two-hour limitation is further reduced when the system's components are used aggressively. Alternate power supplies are available through the use of several adapter plugs included with the CHATS, which allow for the conversion of 100V AC to 240V AC by its internal transformer.

Additionally, direct currents ranging from 12 volts to 30 volts are within the operating parameters of the system. To provide DC current, the system is equipped with a standard cigarette lighter plug. However, military vehicles are not produced with cigarette lighter receptacles, also military vehicles operate with a 24-volt system. Military vehicles are built by the manufactuer with a NATO standardized power receptacle, National Stock Number 013173853, located below the passenger seat, mounted on the front of the battery box. This receptacle is utilized for jump-starting military vehicles when the need arises. To attach the cigarette lighter plug to the vehicle, operators of the CHATS must locally purchase a cigarette lighter receptacle and attach it to one of the two 12-volt batteries that are linked in series to produce the vehicle's 24-volt DC system. Batteries within the primary military vehicle that the CHATS is used in; the HMMWVE (Hum-vee) are stored under the front passenger seat, with the top of the battery box being the anchor for the seat cushion. The size of the battery box precludes the placing of the coupler within it, therefore the cigarette lighter receptacle must be placed outside of the battery box with the wires running into the box. Since the lid to the battery box fits tightly, it must be bent to allow room for the wires to be attached to the batteries inside. This causes the battery box lid/passenger seat to not latch securely creating a risk for the front passenger. Also since the hum-vee is capable of maneuvering over rough terrain, the bouncing of a passenger on the battery box lid creates a potential for the wires to become pinched and consequently shorting out.

SUMMARY OF THE INVENTION

Primary object of the invention is to provide a continuous power supply to the CHATS computer system while deployed within a vehicle.

An additional object of the invention is to prevent damage to the battery box lid/passenger seat by using a universally present power port within the vehicle.

Another object of the adapter cable is to allow the CHATs to be operated up to 15 feet from the vehicle while still utilizing the electrical system of the vehicle.

Finally the invention will eliminate the possibility of short circuits within the vehicle and the CHATS system by utilizing a factory installed power port.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

Figure One is an overall view of the adapter cable, according to the present invention, comprising of a 10-foot cable with cigarette lighter receptacle and a 24-volt DC connector. A depiction of a generic military vehicle and of the CHATS computer system is given for reference only. It must be noted that the 24-volt receptacle present on military vehicles is located in different locations on each vehicle. The hum-vee has its power receptacle located under the front passenger's feet, however larger vehicles have their receptacle located on the outside of the vehicle in various places Generators on the other hand, have their power receptacles located near their batteries, on the outside of the generator housing.

DETAILED DESCRIPTION OF THE PREFERRED ELEMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
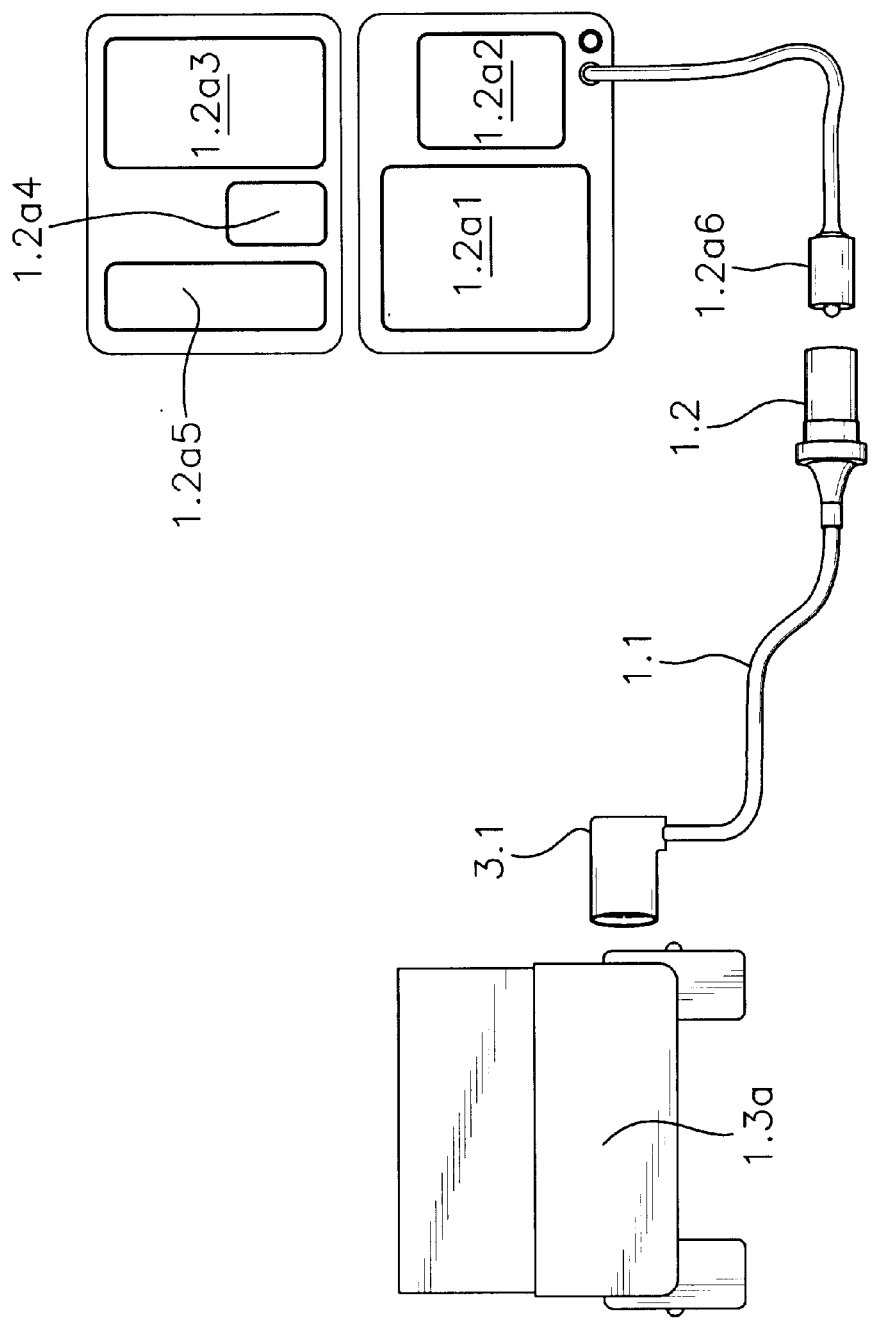

Turing first to FIG. 1, there is shown the entire adapter cable assembly with attached cigarette lighter receptacle 1.2 and a 24-volt DC connector 1.3, which is compatible to standard 24-volt military connectors 13a. The CHATS computer system 1.2a is shown comprised of a laptop computer 1.2a1, secure telephone 1.2a2, scanner 1.2a3, digital camera 1.2a4, and a printer 1.2a5 for reference only. Power is drawn by the CHATS via cigarette lighter plug 1.2a6 when plugged into receptacle 1.2.

Figure 2:
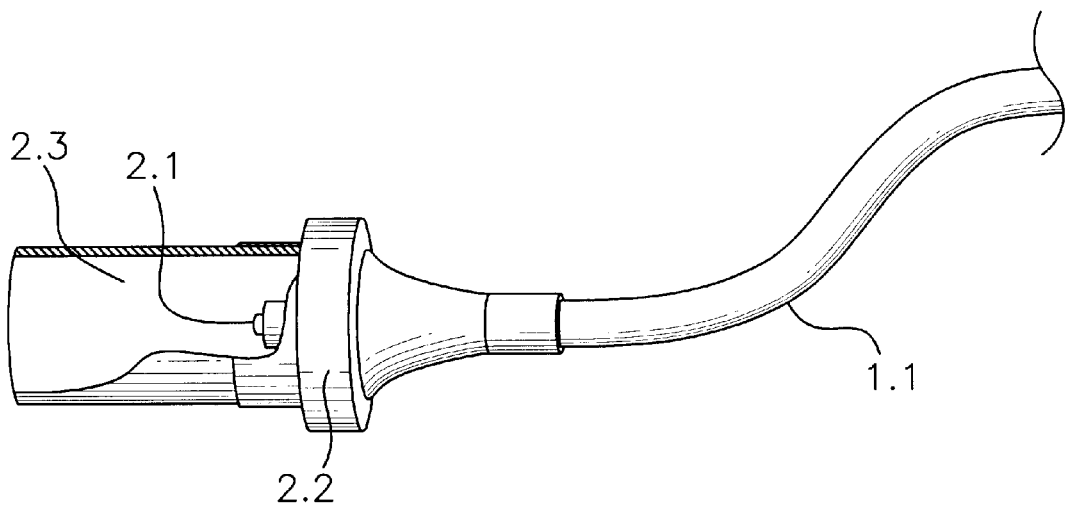
FIG. 2 is a cut away view of the cigarette lighter receptacle assembly shown in FIG. 1 showing the locations of internal electrical components.

Turning to FIG. 2, the cigarette lighter receptacle assembly is shown connected to cable 1.1. The positive power contact 2.1 is exposed through the cut out sheathing 2.2. The negative power sleeve 2.3 is also revealed by the removal of the sheathing 2.2.

Figure 3:
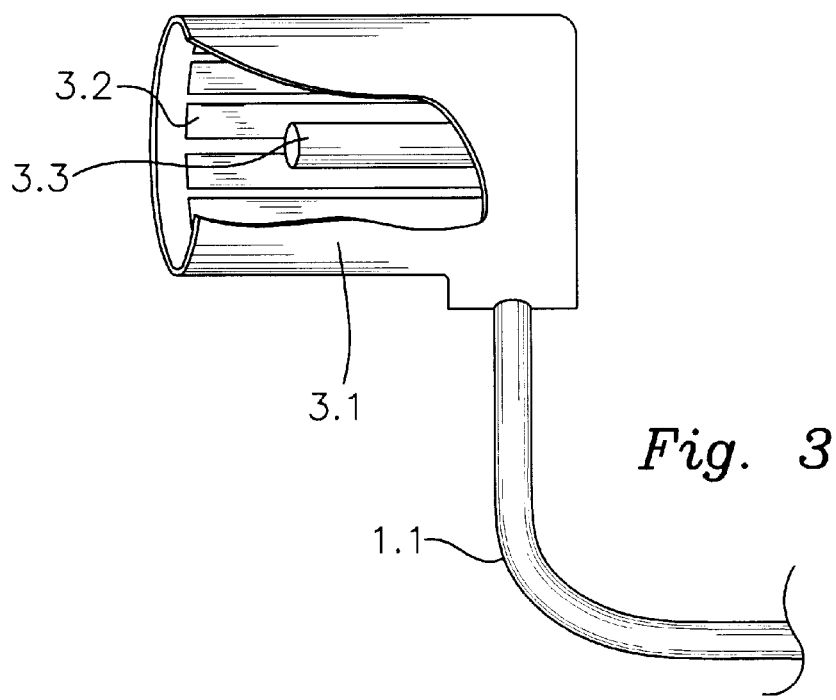
FIG. 3 is a detailed view of the 24-volt DC connector depicted in FIG. 1 with the external sheathing cut out to expose the internal power contacts.

Turning now to the drawings of FIG. 3, the 24-volt DC connector is shown connected to cable 1.1. The protective covering 3.1 is exposed to reveal the outer circle of negative contact tabs 3.2, and the central positive contact prong 3.3.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An adapter apparatus for use with a vehicle containing a manufacturer's installed NATO standardized 24-volt DC receptacle, National Stock Number 013175853, and an electronic end user device powered by a cigarette lighter adapter plug; said adapter apparatus comprising:

a cable with only two insulated wires, a 24-volt DC plug for use with the NATO standardized 24-volt DC receptacle, the 24-volt DC plug connected to the cable at one end thereof;

a cigarette lighter receptacle for use with said cigarette lighter adapter plug of the end user device, the lighter receptacle connected to the cable at another end thereof.

2. The adapter apparatus of claim 1, wherein the end user device consists only of a Counterintelligence Human Intelligence Automated Tool Set (CHATS) computer system comprised solely of the following elements:

a laptop computer, a laser scanner, a color printer, a digital camera, and a secure telephone.

3. The adapter apparatus of claim 1, wherein the 24-volt DC plug comprises:

an outer negative conducting ring, an inner positive conducting post, a housing of the 24-volt DC plug composed of insulating rubber.

* * * * *